US012429826B2

(12) United States Patent
Muraji

(10) Patent No.: US 12,429,826 B2
(45) Date of Patent: Sep. 30, 2025

(54) TIMEPIECE

(71) Applicant: SEIKO TIME CREATION INC., Tokyo (JP)

(72) Inventor: Toyonori Muraji, Tokyo (JP)

(73) Assignee: SEIKO TIME CREATION INC., Tokyo (JP)

(*) Notice: Subject to any disclaimer, the term of this patent is extended or adjusted under 35 U.S.C. 154(b) by 384 days.

(21) Appl. No.: 18/150,530

(22) Filed: Jan. 5, 2023

(65) Prior Publication Data

US 2023/0229113 A1 Jul. 20, 2023

(30) Foreign Application Priority Data

Jan. 18, 2022 (JP) ................................ 2022-005683

(51) Int. Cl.
*G04B 45/00* (2006.01)

(52) U.S. Cl.
CPC ................................ *G04B 45/0038* (2013.01)

(58) Field of Classification Search
CPC . G04B 45/00; G04B 45/0023; G04B 45/0038
See application file for complete search history.

(56) References Cited

U.S. PATENT DOCUMENTS 6,229,768 B1 * 5/2001 Nakazawa ........... G04B 19/065 368/233
11,449,006 B2 * 9/2022 Leskerpit ............. G04B 47/044
2007/0277578 A1 * 12/2007 Muraji ............... G04B 45/0023 72/354.2
2007/0280055 A1 * 12/2007 Muraji ............... G04B 45/0023 368/223
2008/0239884 A1 * 10/2008 Muraji ................. G04B 47/044 368/232
2011/0019507 A1 * 1/2011 Muraji ............... G04B 45/0007 368/220
2013/0028057 A1 * 1/2013 Nagatake ............. G04B 47/044 368/228
2014/0334273 A1 * 11/2014 Tako ...................... G04B 45/00 368/285
2020/0333747 A1 * 10/2020 Muraji ............... G04B 45/0038

FOREIGN PATENT DOCUMENTS

JP 3691946 B2 9/2005
JP 2014-215093 A 11/2014

* cited by examiner

*Primary Examiner* — Edwin A. Leon
*Assistant Examiner* — Jason M Collins
(74) *Attorney, Agent, or Firm* — Crowell & Moring LLP

(57) ABSTRACT

A timepiece according to the present invention includes a decorative body that operates stably and intricately. The timepiece further includes a main plate provided with external teeth extending in a circular-arc shape with a central axis O as a center and a rotating plate rotatable around the central axis O with respect to the main plate The timepiece further includes a first gear rotatably supported on the rotating plate and a transmission gear train rotatably supported on the rotating plate, meshing with the external teeth and the first gear. The transmission gear train is configured to transmit, to the first gear, rotation of the main plate with respect to the rotating plate The timepiece further includes a first front decorative body non-rotatably connected to the first gear and displaceable with respect to the rotating plate.

5 Claims, 6 Drawing Sheets

TIMEPIECE

RELATED APPLICATIONS

This application claims priority to Japanese Patent Application No. 2022-005683, filed on Jan. 18, 2022, the entire content of which is incorporated herein by reference.

BACKGROUND OF THE INVENTION

1. Field of the Invention

The present invention relates to a timepiece.

2. Description of the Related Art

There is a gimmick clock moving a decorative body (refer to, for example, JP-A-2014-215093 and Japanese Patent No. 3691946). The gimmick clock described in JP-A-2014-215093 includes a main plate, a rotating plate rotatable relative to the main plate, a gear rotatably supported on the rotating plate, and a decorative body connected to the gear. The gear is rotatably supported by the rotating plate, and meshes with an external tooth part or an internal tooth part of the main plate to rotate while revolving. The gimmick clock described in Japanese Patent No. 3691946 includes a drive device that drives an annular rotating decorative plate. A tooth part that meshes with a gear driven by the drive device is provided on an outer peripheral portion of the rotating decorative plate. At least one movable decoration is rotatably provided to the rotating decorative plate.

However, in the gimmick clock described in JP-A-2014-215093, since there is little room for adjusting a gear ratio between the gear and the external tooth part or the internal tooth part from a viewpoint of an arrangement space of components, a relation between a rotation period and a revolution period of the gear is limited to some extent. Therefore, novelty is less likely to occur in an operation of the decorative body. In the gimmick clock described in Japanese Patent No. 3691946, since a direction of the movable decoration is maintained by gravity, a desired operation of the movable decoration may not be achieved depending on a posture of the clock. Therefore, it is desired to develop a timepiece including a decorative body that operates more intricately and stably than a gimmick clock in the related art.

SUMMARY OF THE INVENTION

Therefore, the invention provides a timepiece including a decorative body that operates stably and intricately.

According to a first aspect of the invention, there is provided a timepiece including: a main plate provided with a tooth part extending in a circular-arc shape with a predetermined axis as a center; a rotating plate rotatable around the predetermined axis with respect to the main plate; a gear rotatably supported on the rotating plate; a transmission gear train rotatably supported on the rotating plate, meshing with the tooth part and the gear, and configured to transmit, to the gear, rotation of the main plate with respect to the rotating plate; and a decorative body non-rotatably connected to the gear and displaceable with respect to the rotating plate.

According to the invention, when the rotating plate is rotated with respect to the main plate, the gear can rotate in a rotation speed of the gear that is determined according to a speed reduction ratio in the transmission gear train and a rotation direction of the gear that is determined according to a direction of a torque transmitted to the gear by the transmission gear train. Therefore, it is possible to achieve an operation that is difficult when the decorative body is connected to a gear directly meshing with the tooth part of the main plate. Since the gear meshes with the tooth part of the main plate via the transmission gear train, it is possible to prevent a direction of the decorative body from changing depending on a posture of the timepiece. Therefore, it is possible to provide a timepiece including a decorative body that operates stably and intricately.

According to a second aspect of the invention, in the timepiece of the first aspect, the decorative body may move in parallel with respect to the main plate along with rotation of the rotating plate.

According to the invention, it is possible to provide a more interesting timepiece as compared to a timepiece in the related art.

According to a third aspect of the invention, in the timepiece of the first or second aspect, the gear may rotate with respect to the rotating plate in a direction opposite to a rotation direction of the rotating plate around the predetermined axis, and rotate at a speed reduction ratio of 1 with respect to the tooth part.

According to the invention, a rotation period of the gear with respect to the rotating plate (rotation period) can be made to coincide with a rotation period of the gear around the predetermined axis (revolution period). Since the rotation direction of the gear with respect to the rotating plate (rotation direction) is opposite to a rotation direction of the gear around the predetermined axis (revolution direction), the gear moves in parallel with respect to the main plate. Therefore, it is possible to achieve a configuration in which the decorative body moves in parallel with respect to the main plate.

According to a fourth aspect of the invention, in the timepiece of the first, second, or third aspect, the tooth part may be external teeth.

According to the invention, when the transmission gear train has a single intermediate gear meshing with the tooth part and the gear, the rotation direction of the gear with respect to the rotating plate (rotation direction) can be made opposite to the rotation direction of the gear around the predetermined axis (revolution direction). Accordingly, it is possible to achieve the configuration in which the decorative body moves in parallel with respect to the main plate using a small number of components.

According to a fifth aspect of the invention, in the timepiece of any one of the first to fourth aspect, the timepiece may further include another gear rotatably supported on the rotating plate, and the gear may be the same component as the other gear.

According to the invention, it is possible to prevent increase in a component to be newly designed in providing the timepiece achieving the operation and effect described above. Therefore, the timepiece described above can be manufactured at a low cost.

According to the invention, it is possible to provide the timepiece including the decorative body that operates stably and intricately.

DETAILED DESCRIPTION OF THE PREFERRED EMBODIMENTS

Figure 1:
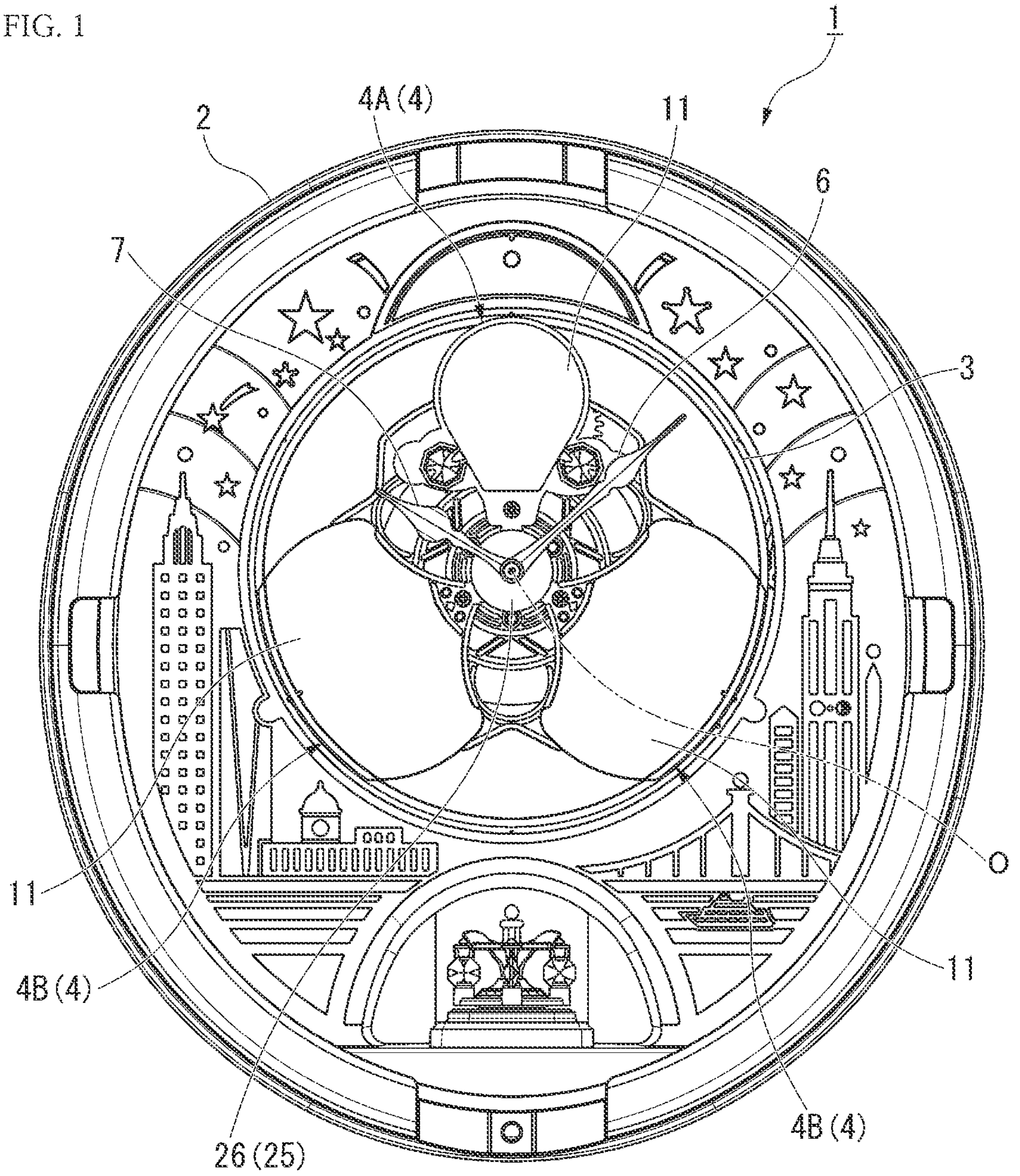
FIG. 1 is a front view of a timepiece according to an embodiment.

Hereinafter, embodiments of the invention will be described with reference to the drawings. In the following description, configurations having the same or similar functions are denoted by the same reference numerals. Repeated description of these configurations may be omitted.

First, a schematic configuration of a timepiece 1 will be described.

FIG. 1 is a front view of a timepiece according to an embodiment.

As shown in FIG. 1, the timepiece 1 is a gimmick clock. The timepiece 1 includes a front plate 2 which is decorated and has an opening formed at a center thereof, a decorative plate 3 rotatably disposed in the opening of the front plate 2, a plurality of (in this embodiment, three) front decorative bodies 4 which are disposed on a front side of the decorative plate 3 and movable, and a minute hand 6 and an hour hand 7 rotating around a central axis O (a predetermined axis) and indicating a time. FIG. 1 shows a state in which the decorative plate 3 and the front decorative bodies 4 are in initial positions.

The decorative plate 3 is formed in a disk shape centered on the central axis O. Numbers indicating the time may be clearly indicated on a front surface of the decorative plate 3.

The plurality of front decorative bodies 4 are provided so as to be rotatable with respect to the decorative plate 3. Rotation centers of the plurality of front decorative bodies 4 are disposed at equal angular intervals around the central axis O. Numbers indicating the time may be clearly indicated on a front surface of each of the front decorative bodies 4. In this case, numbers "1" to "12" are arranged at equal angular intervals around the central axis O on the decorative plate 3 and the front decorative bodies 4. In an initial state, the decorative plate 3 and the plurality of front decorative bodies 4 are maintained in a circular state as a whole when viewed from the front and function as a single dial.

At a predetermined time, the decorative plate 3 rotates around the central axis O, and the plurality of front decorative bodies 4 rotate while revolving around the central axis O. After a predetermined time has elapsed, the decorative plate 3 and the plurality of front decorative bodies 4 return to the initial positions. In this manner, the timepiece 1 executes a gimmick motion at the predetermined time. A rotation range, movement, or the like of the decorative plate 3 is not particularly limited, and for example, the decorative plate 3 may be set so as to rotate 360°. Further, the timepiece 1 may be configured such that music is output from a speaker while the decorative plate 3 is rotating.

Subsequently, a configuration of a main part of the timepiece 1 will be described in detail.

Figure 2:
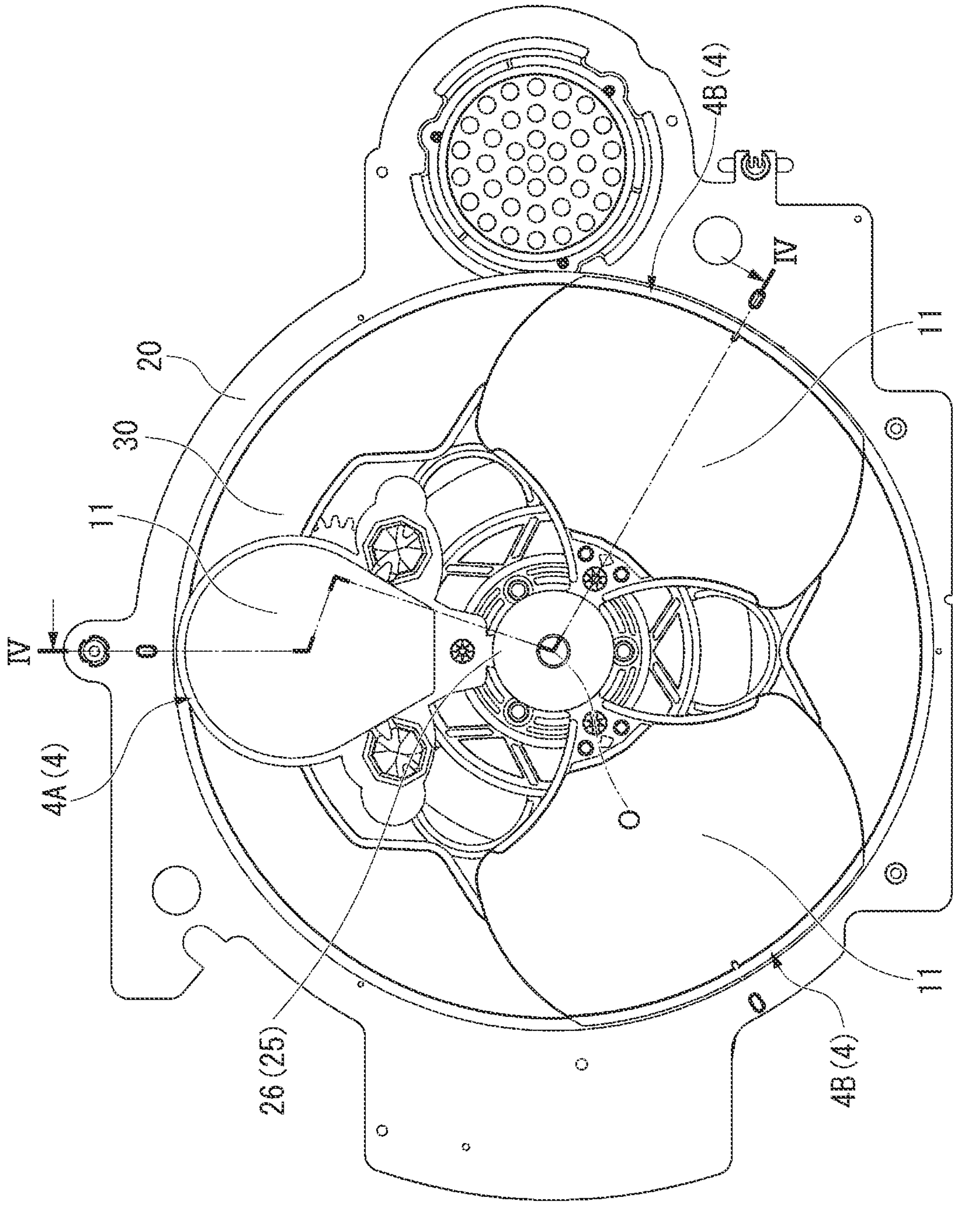
FIG. 2 is a plan view showing a part of the timepiece according to the embodiment.
Figure 3:
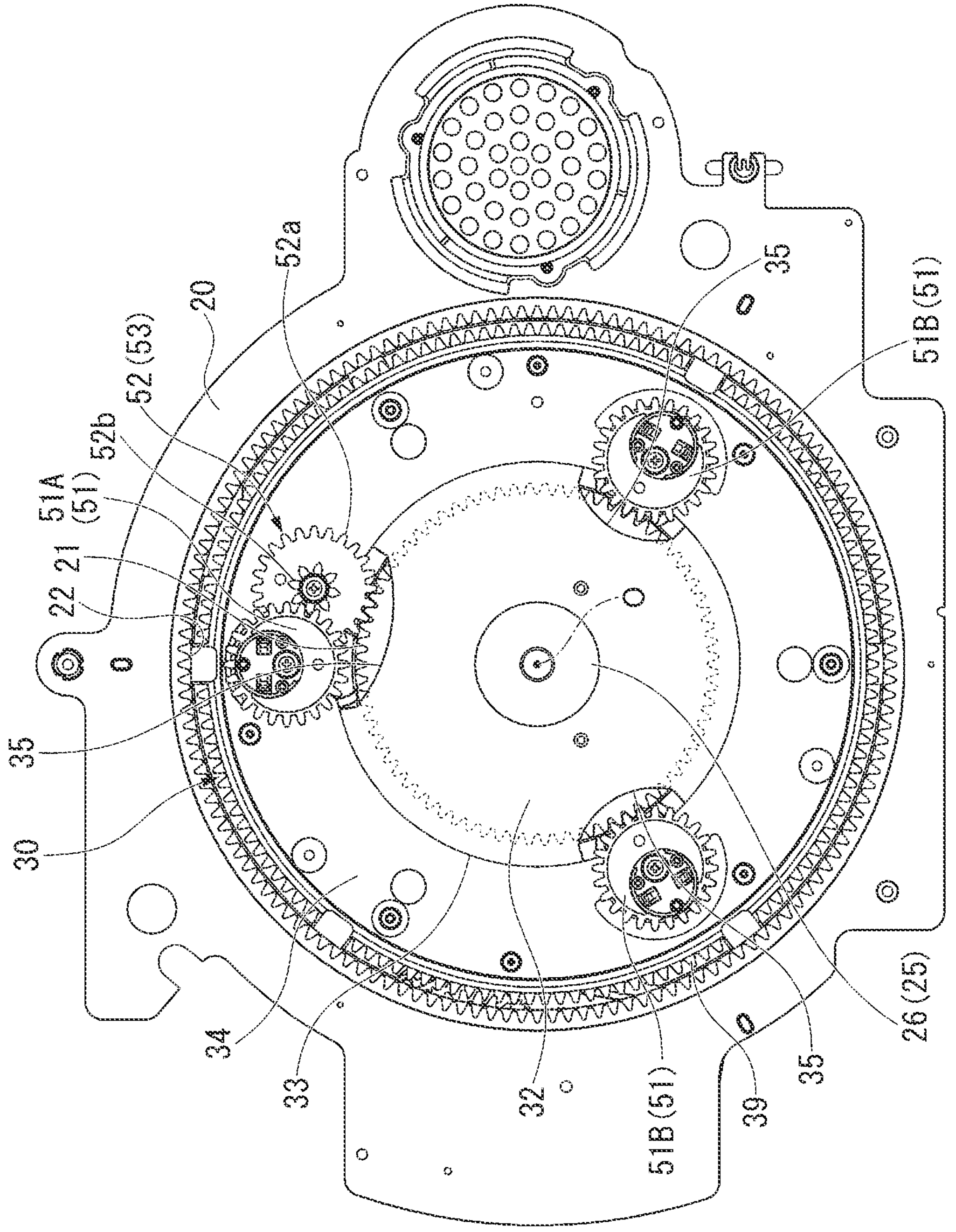
FIG. 3 is a plan view showing a part of the timepiece according to the embodiment.
Figure 4:
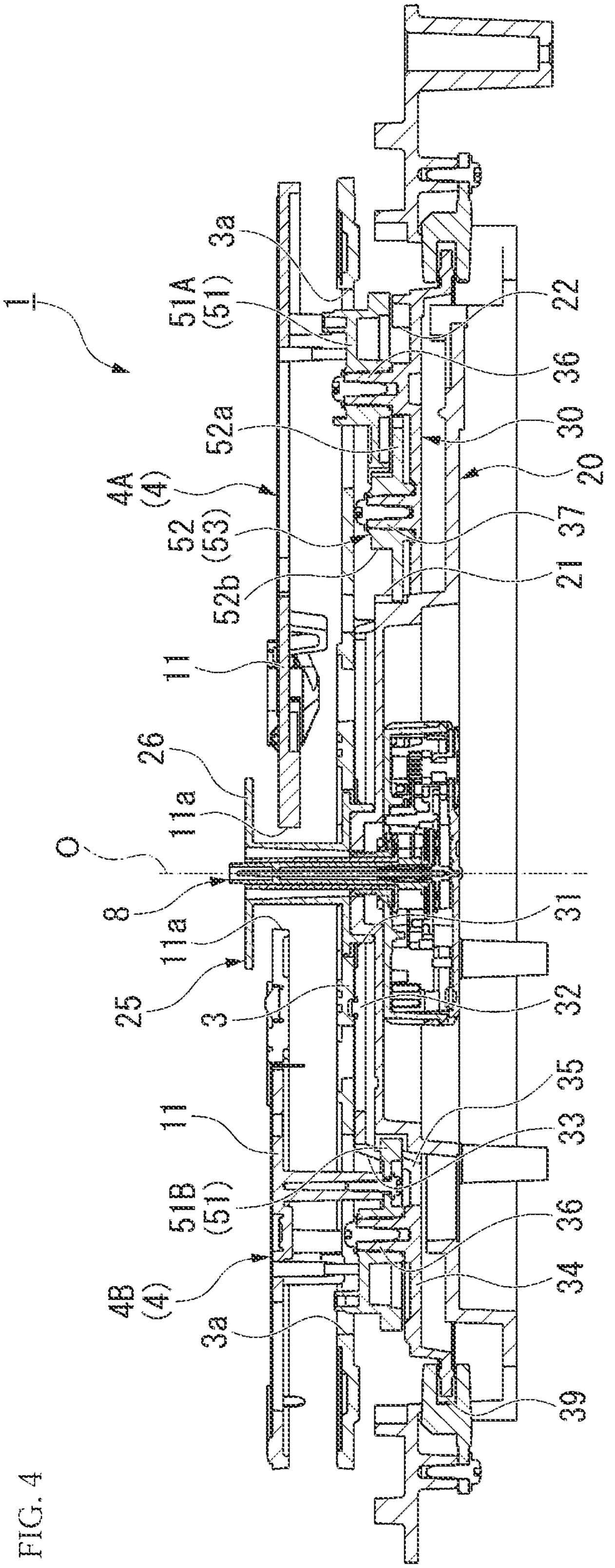
FIG. 4 is a cross-sectional view taken along line IV-IV in FIG. 2.

FIGS. 2 and 3 are plan views showing a part of the timepiece according to the embodiment. FIG. 4 is a cross-sectional view taken along line IV-IV in FIG. 2. FIG. 3 shows a state in which the decorative plate 3 and the front decorative bodies 4 are removed from the part of the timepiece shown in FIG. 2.

As shown in FIGS. 2 to 4, the timepiece 1 includes a main plate 20 fixedly disposed on the front plate 2 (see FIG. 1), a fixed member 25 fixedly supported on the main plate 20, a rotating plate 30 rotatable relative to the main plate 20 around the central axis O, and gears 51 rotatably supported on the rotating plate 30 and having the same number as the front decorative bodies 4. In the following description, a direction along the central axis O is referred to as an axial direction, a direction orthogonal to the central axis O and radially extending from the central axis O is referred to as a radial direction, and a circumferential direction around the central axis O is simply referred to as a circumferential direction.

As shown in FIGS. 3 and 4, the main plate 20 is disposed on a rear side of the decorative plate 3. A movement that drives a rotary shaft 8 to which the minute hand 6 and the hour hand 7 are mounted, a motor that drives the rotating plate 30, and the like are disposed on the rear side of the main plate 20. The rotary shaft 8 penetrates an approximate center of the main plate 20. External teeth 21 (tooth part) and internal teeth 22 are provided on a front side of the main plate 20. The external teeth 21 extend in a circumferential shape around the central axis O. The internal teeth 22 extend in a circumferential shape around the central axis O (refer to FIG. 3 as well). The internal teeth 22 are provided on an outer side in the radial direction of the external teeth 21. However, the external teeth 21 and the internal teeth 22 may extend less than 360° in a circular-arc shape in accordance with a moving range of the gear 51 to be described later. The internal teeth 22 may be omitted.

The fixed member 25 is supported on the front side of the main plate 20. The fixed member 25 is formed in a cylindrical shape extending with the central axis O as a center and opened on both sides in the axial direction. The fixed member 25 surrounds the rotary shaft 8. A flange portion 26 protruding outward in the radial direction is provided at an end portion on a front side of the fixed member 25.

The rotating plate 30 is disposed on the front side of the main plate 20 and on a rear side of the flange portion 26 of the fixed member 25. The rotating plate 30 is formed in a circular shape with the central axis O as a center when viewed from the front. A through-hole 31 into which an end portion on the rear side of the fixed member 25 is inserted so as to be relatively rotatable is formed at the center of the rotating plate 30.

The rotating plate 30 includes an inner peripheral portion 32 extending from an inner peripheral end portion of the through-hole 31 to the outside in the radial direction, a stepped portion 33 extending from an outer peripheral end portion of the inner peripheral portion 32 to the rear side, and an outer peripheral portion 34 extending from an end portion on the rear side of the stepped portion 33 to the outside in the radial direction. The stepped portion 33 is located on the outer side in the radial direction of the external teeth 21 provided on the main plate 20. The stepped portion 33 is formed with window portions 35 which are equal in number to the gears 51 and into each of which the gear 51 is inserted. Teeth 39 are formed on an outer peripheral surface of the outer peripheral portion 34. The teeth 39 are located on an inner side in the radial direction of the internal teeth 22 provided on the main plate 20. The teeth 39 mesh with a gear (not shown) and are connected to an output shaft of the motor described above.

As shown in FIG. 4, the outer peripheral portion 34 is provided with a plurality of first shaft portions 36 each supporting the gear 51, and a second shaft portion 37 supporting an intermediate gear 52. The plurality of first shaft portions 36 are provided in the same number as the plurality of gears 51. Each of the first shaft portions 36 and the second shaft portion 37 protrudes to the front side. Each of the plurality of first shaft portions 36 is provided at a position overlapping the window portion 35 formed in the stepped portion 33 in the circumferential direction. The first shaft portions 36 are provided at equal angular intervals around the central axis O. In the present embodiment, the first shaft portions 36 are disposed at positions corresponding to 12 o'clock, 4 o'clock, and 8 o'clock in the initial state, respectively. The second shaft portion 37 is close to the first shaft portion 36 disposed at the position corresponding to 12 o'clock among the plurality of first shaft portions 36.

As shown in FIGS. 3 and 4, the plurality of gears 51 are rotatably supported on the first shaft portions 36, respectively. The plurality of gears 51 include a first gear 51A disposed at the position corresponding to 12 o'clock in the initial state, and second gears 51B disposed at the positions corresponding to 4 o'clock and 8 o'clock in the initial state, respectively. The first gear 51A and the second gear 51B are the same components. The first gear 51A is separated from the external teeth 21 and the internal teeth 22, and does not directly mesh with the external teeth 21 and the internal teeth 22 of the main plate 20. Each of the second gear 51B passes through the window portion 35 of the rotating plate 30, and meshes with the external teeth 21 of the main plate 20 on the rear side of the rotating plate 30. As a result, when the rotating plate 30 rotates with respect to the main plate 20, while the second gears 51B revolve around the central axis O in synchronization with the rotation of the rotating plate 30, the second gears 51B rotate in the same rotation direction as the revolution. The number of teeth of the second gear 51B is smaller than the number of teeth of the external teeth 21. Accordingly, a rotation period of the second gear 51B is shorter than a revolution period of the second gear 51B.

The timepiece 1 further includes a transmission gear train 53 that transmits, to the first gear 51A, the rotation of the main plate 20 with respect to the rotating plate 30. The transmission gear train 53 is formed of at least one gear. The transmission gear train 53 meshes with the external teeth 21 of the main plate 20 and the first gear 51A. The transmission gear train 53 according to the present embodiment includes the single intermediate gear 52. The intermediate gear 52 is rotatably supported by the second shaft portion 37. The intermediate gear 52 is a so-called two-stage gear in which a large diameter tooth part 52*a* and a small diameter tooth part 52*b* are coaxially connected in the axial direction. The large diameter tooth part 52*a* meshes with the external teeth 21 of the main plate 20. As a result, when the rotating plate 30 rotates with respect to the main plate 20, while the intermediate gear 52 revolves around the central axis O in synchronization with the rotation of the rotating plate 30, the intermediate gear 52 rotates in the same rotation direction as the revolution. The small diameter tooth part 52*b* is located on a front side of the large diameter tooth part 52*a* and meshes with the first gear 51A. As a result, the intermediate gear 52 transmits, to the first gear 51A, rotation with respect to the rotating plate 30 (rotation).

Here, when the number of teeth of the external teeth 21 is X, the number of teeth of the large diameter tooth part 52*a* is A, the number of teeth of the small diameter tooth part 52*b* is B, and the number of teeth of the first gear 51A is Y, a relation of X: A=Y: B is established. As a result, a revolution period and a rotation period of the first gear 51A coincide with each other. In the present embodiment, the number of teeth of the external teeth 21 is 72, the number of teeth of the large diameter tooth part 52*a* is 24, the number of teeth of the small diameter tooth part 52*b* is 8, and the number of teeth of the first gear 51A is 24. Since the transmission gear train 53 includes an odd number of (in the present embodiment, one) gears, the external teeth 21 and the first gear 51A can be rotated in opposite directions with reference to the rotating plate 30. As a result, a revolution direction and a rotation direction of the first gear 51A are opposite to each other.

As shown in FIGS. 2 and 4, the decorative plate 3 is disposed on a front side of the rotating plate 30. The decorative plate 3 is fixedly mounted to the rotating plate 30. As a result, the decorative plate 3 rotates around the central axis O integrally with the rotating plate 30. The decorative plate 3 is provided with through-holes 3*a* into each of which a connection portion of the gear 51 and the front decorative body 4 is arranged.

The front decorative bodies 4 are disposed at positions corresponding to 12 o'clock, 4 o'clock, and 8 o'clock in the initial state, respectively. The front decorative bodies 4 include a first front decorative body 4A disposed at the position corresponding to 12 o'clock in the initial state, and second front decorative bodies 4B disposed at positions corresponding to 4 o'clock and 8 o'clock in the initial state, respectively. Each of the front decorative bodies 4 includes a plate-shaped main body portion 11 extending along a direction orthogonal to the axial direction. The main body portion 11 is provided with a claw portion 11*a* that forms an end portion on a central axis O side in the initial state (refer to FIG. 5 as well). The claw portion 11*a* is located on the rear side of the flange portion 26 of the fixed member 25 in the initial state, and overlaps the flange portion 26 when viewed from the axial direction. As a result, displacement of a front side of the claw portion 11*a* of the front decorative body 4 is restricted, and the front decorative body 4 is prevented from being swayed when, for example, an impact is applied to the timepiece 1. The front decorative bodies 4 are non-rotatably connected to the respective gears 51 one by one on a rear side of the main body portion 11. The first front decorative body 4A is fixed to the first gear 51A. The second front decorative bodies 4B are fixed to the respective second gears 51B one by one. Since the front decorative body 4 is fixed to the gear 51, the front decorative body 4 rotates integrally with the gear 51 with respect to the rotating plate 30 and the decorative plate 3. Each of the front decorative bodies 4 is formed in a shape that does not interfere with each other and does not come into contact with the fixed member 25 when rotating with respect to the rotating plate 30.

Next, an operation of the timepiece 1 will be described in detail.

As shown in FIGS. 1 to 3, in the initial state of the timepiece 1 as described above, the decorative plate 3 and the plurality of front decorative bodies 4 are maintained in the circular state as a whole when viewed from the front.

Figure 5:
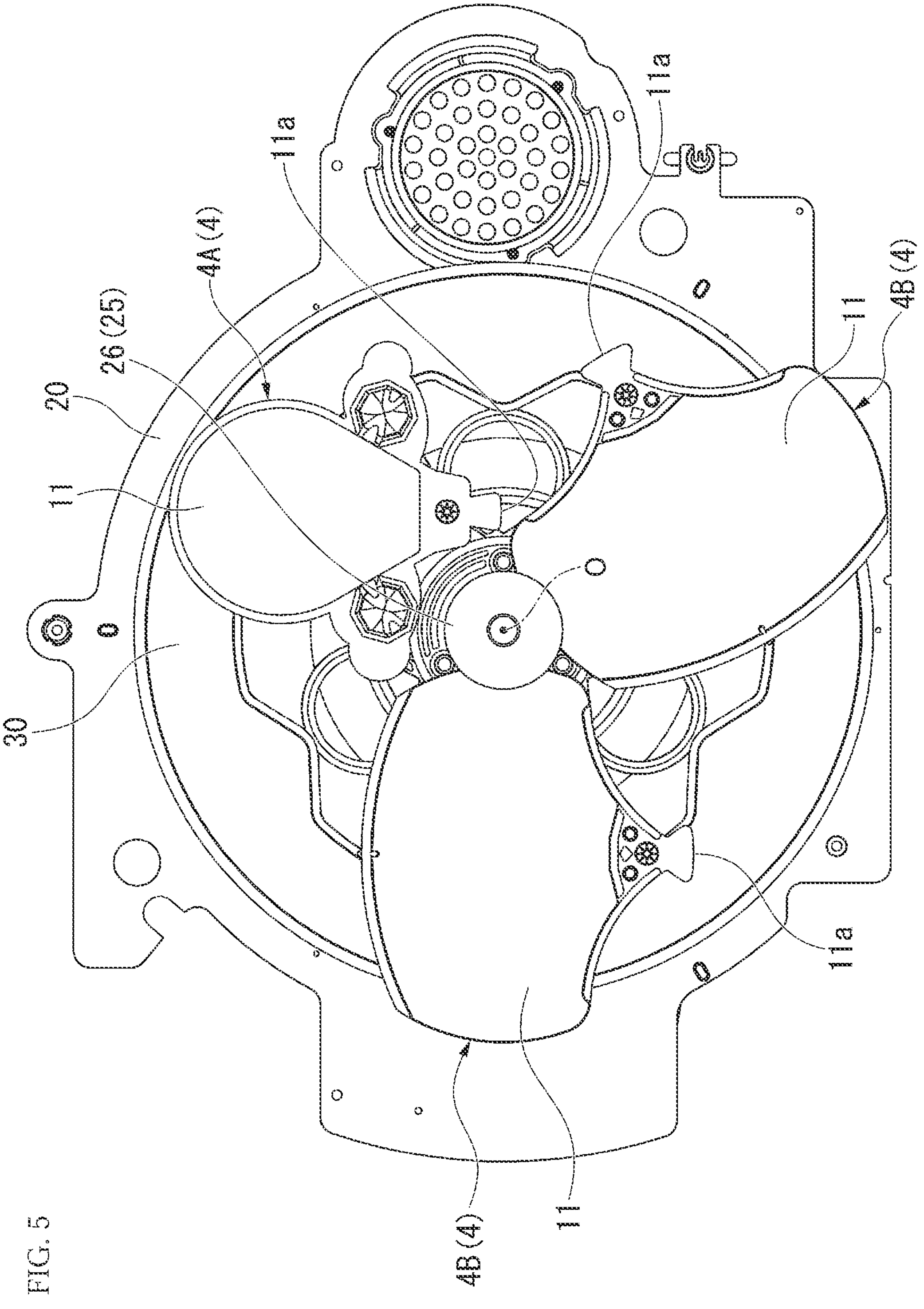
FIG. 5 is a plan view showing a state in which the part of the timepiece shown in FIG. 2 is displaced.
Figure 6:
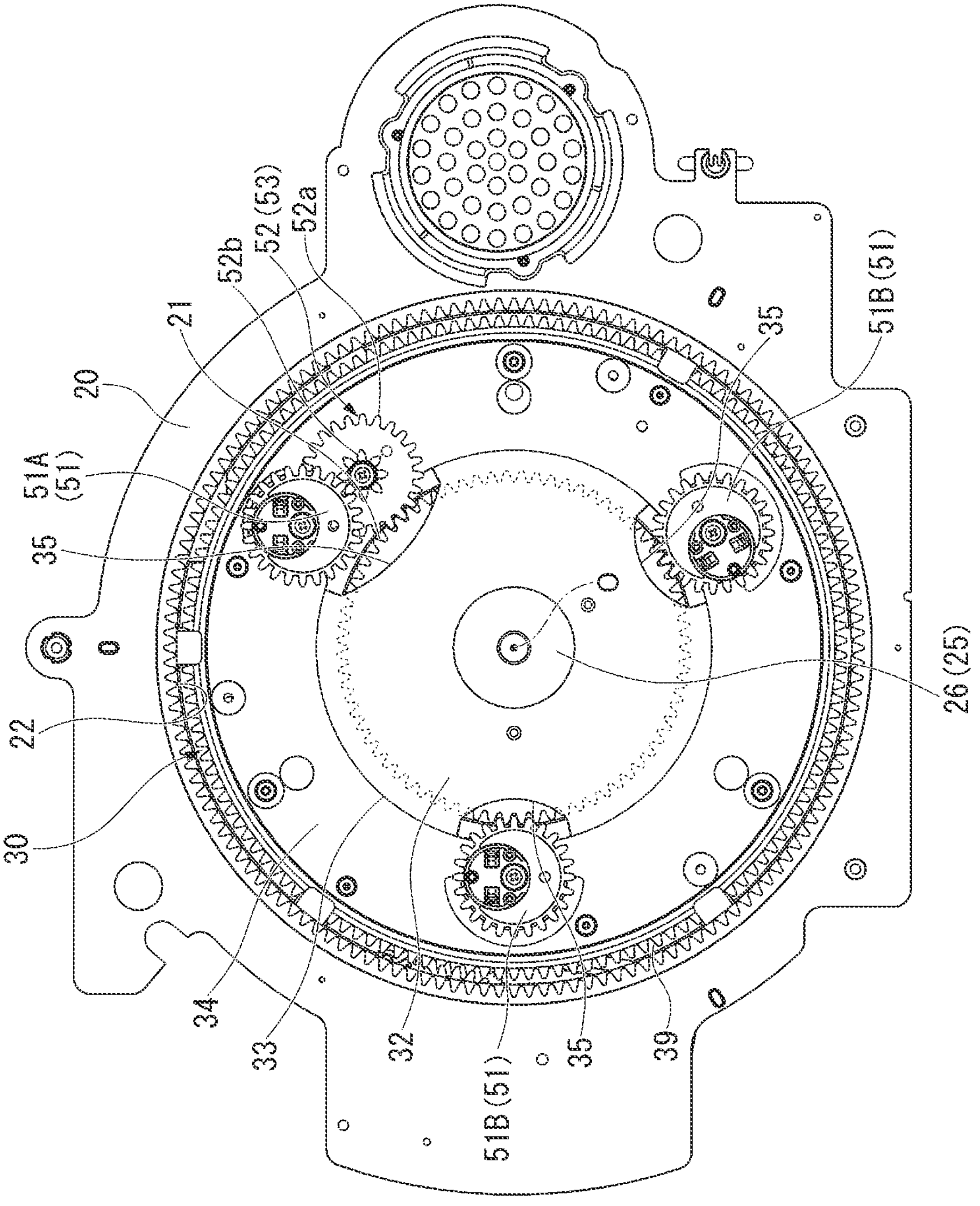
FIG. 6 is a plan view showing a part of the timepiece shown in FIG. 5.

FIG. 5 is a plan view showing a state in which the part of the timepiece shown in FIG. 2 is displaced. FIG. 6 is a plan view showing a part of the timepiece shown in FIG. 5. FIG. 6 shows a state in which the decorative plate 3 and the front decorative bodies 4 are removed from the part of the timepiece shown in FIG. 5.

Here, as shown in FIGS. 5 and 6, when the motor is driven to rotate the rotating plate 30 with respect to the main plate 20, the gears 51 and the intermediate gear 52 revolve. Since the second gears 51B and the intermediate gear 52 mesh with the external teeth 21 of the main plate 20, the second gears 51B and the intermediate gear 52 rotate in synchronization with the revolution. Along with the rotation of the intermediate gear 52, the first gear 51A meshing with the intermediate gear 52 also rotates in synchronization with the revolution. As a result, the front decorative body 4 fixedly mounted to the gear 51 also rotates with respect to the decorative plate 3. At this time, since the revolution direction and the rotation direction of the first gear 51A are opposite to each other and the revolution period and the rotation period of the first gear 51A coincide with each other, the first front decorative body 4A moves in parallel (translates) with respect to the front plate 2. Meanwhile, since a revolution direction and a rotation direction of the second gear 51B coincide with each other, the second front decorative body 4B rotates with respect to the front plate 2.

As described above, the timepiece 1 according to the present embodiment includes: the first gear 51A rotatably supported on the rotating plate 30; the intermediate gear 52 rotatably supported on the rotating plate 30, meshing with the external teeth 21 of the main plate 20 and the first gear 51A, and transmitting, to the first gear 51A, the rotation of the main plate 20 with respect to the rotating plate 30; and the first front decorative body 4A non-rotatably connected to the first gear 51A and displaceable with respect to the rotating plate 30. According to this configuration, when the rotating plate 30 is rotated with respect to the main plate 20, the first gear 51A can rotate in a rotation speed of the first gear 51A that is determined according to a speed reduction ratio in the intermediate gear 52 and a rotation direction of the first gear 51A that is determined according to a direction of a torque transmitted to the first gear 51A by the intermediate gear 52. Therefore, it is possible to achieve an operation that is difficult when the front decorative body is connected to a gear directly meshing with the external teeth 21 or the internal teeth 22 of the main plate 20. Further, since the first gear 51A meshes with the external teeth 21 of the main plate 20 via the transmission gear train 53, it is possible to prevent a direction of the first front decorative body 4A from changing depending on a posture of the timepiece 1. Therefore, it is possible to provide a timepiece including the front decorative body 4 that operates stably and intricately.

In addition, the first front decorative body 4A moves in parallel to the main plate 20 along with the rotation of the rotating plate 30. According to this configuration, it is possible to provide a more interesting timepiece as compared to a timepiece in the related art.

The first gear 51A rotates in a direction opposite to the revolution direction and rotates at a speed reduction ratio of 1 with respect to the external teeth 21 of the main plate 20. According to this configuration, the rotation period of the first gear 51A can be made to coincide with the revolution period of the first gear 51A. In addition, since the rotation direction of the first gear 51A is opposite to the revolution direction of the first gear 51A, the first gear 51A moves in parallel with respect to the main plate 20. Therefore, it is possible to achieve a configuration in which the first front decorative body 4A moves in parallel with respect to the main plate 20.

The intermediate gear 52 meshes with the external teeth 21 of the main plate 20. According to this configuration, the rotation direction of the first gear 51A can be made opposite to the revolution direction of the first gear 51A by the single intermediate gear 52. Accordingly, it is possible to achieve a configuration in which the first front decorative body 4A moves in parallel with respect to the main plate 20 using a small number of components.

The timepiece 1 further includes the second gears 51B rotatably supported on the rotating plate. The first gear 51A is the same component as the second gears 51B. According to this configuration, it is possible to prevent increase in a component to be newly designed in providing the timepiece 1 achieving the operation and effect described above. Therefore, the timepiece 1 described above can be manufactured at a low cost.

The invention is not limited to the embodiments described with reference to the drawings, and various modifications can be considered within the technical scope of the invention.

For example, in the embodiment described above, three front decorative bodies 4 are provided, but the invention is not limited to this configuration. The number of the front decorative bodies can be set to any number.

In the embodiment described above, the transmission gear train 53 is implemented by the single intermediate gear 52, but the transmission gear train may be implemented by a plurality of gears. However, when the transmission gear train meshes with the external teeth 21 of the main plate 20 in the same manner as in the embodiment described above, it is desirable that the number of the gears implementing the transmission gear train is an odd number. As a result, the external teeth 21 and the first gear 51A can be rotated in opposite directions with reference to the rotating plate 30 to make the revolution direction and the rotation direction of the first gear 51A opposite to each other. Therefore, as in the embodiment described above, the first front decorative body 4A can move in parallel with respect to the main plate 20.

In the embodiment described above, the transmission gear train 53 meshes with the external teeth 21 of the main plate 20, but the invention is not limited to this configuration. That is, the transmission gear train may mesh with the first gear 51A and the internal teeth 22 of the main plate 20. In this case, it is desirable that the number of the gears implementing the transmission gear train is an even number. As a result, the internal teeth 22 and the first gear 51A can be rotated in opposite directions with reference to the rotating plate 30 to make the revolution direction and the rotation direction of the first gear 51A opposite to each other. Therefore, as in the embodiment described above, the first front decorative body 4A can move in parallel with respect to the main plate 20.

In the embodiment described above, the first front decorative body 4A is formed to move in parallel, but the operation of the first front decorative body is not particularly limited. However, it is desirable that the first front decorative body performs an operation different from that of the second front decorative bodies 4B.

In addition, it is possible to appropriately replace components in the embodiments described above with known components without departing from the spirit of the invention.

What is claimed is:

1. A timepiece, comprising:

a main plate provided with a tooth part extending in a circular-arc shape with a predetermined axis as a center;

a rotating plate rotatable around the predetermined axis with respect to the main plate;

a gear rotatably supported on the rotating plate;

a transmission gear train rotatably supported on the rotating plate, meshing with the tooth part and the gear, wherein the transmission gear train is configured to transmit, to the gear, rotation of the main plate with respect to the rotating plate; and a decorative body non-rotatably connected to the gear and displaceable with respect to the rotating plate.

2. The timepiece according to claim 1, wherein the decorative body is arranged to move in parallel with respect to the main plate along with rotation of the rotating plate.

3. The timepiece according to claim 1, wherein the gear is configured to rotate with respect to the rotating plate in a direction opposite to a rotation direction of the rotating plate around the predetermined axis, and to rotate at a speed reduction ratio of 1 with respect to the tooth part.

4. The timepiece according to claim 1, wherein the tooth part is external teeth.

5. The timepiece according to claim 1, further comprising a second gear rotatably supported on the rotating plate, wherein the gear and the second gear are configured similarly.

* * * * *